United States Patent
Yang et al.

(10) Patent No.: US 6,858,670 B2
(45) Date of Patent: Feb. 22, 2005

(54) METHOD FOR MAKING SOLID POLYMER ELECTROLYTE AND USES THEREOF

(75) Inventors: Chun-Chen Yang, Taipei Hsien (TW); Sheng-Jen Lin, Taipei (TW); Chi-Neng Huang, Taipei Hsien (TW); Jung-Ming Chiu, Taipei Hsien (TW); Kung-Chun Liaw, Taipei Hsien (TW)

(73) Assignee: Nan Ya Plastics Corporation, Taipei (TW)

( * ) Notice: Subject to any disclaimer, the term of this patent is extended or adjusted under 35 U.S.C. 154(b) by 227 days.

(21) Appl. No.: 10/205,463

(22) Filed: Jul. 26, 2002

(65) Prior Publication Data

US 2003/0139527 A1 Jul. 24, 2003

(30) Foreign Application Priority Data

Dec. 13, 2001 (TW) .......................................... 90130861 A

(51) Int. Cl.[7] .............................................. C08G 63/91
(52) U.S. Cl. .......................................................... 525/61
(58) Field of Search ............................................ 525/61

(56) References Cited

FOREIGN PATENT DOCUMENTS

JP            406145363 A   *   5/1994   .............. C08J/3/03

* cited by examiner

Primary Examiner—William K. Cheung
(74) Attorney, Agent, or Firm—Troxell Law Office PLLC

(57) ABSTRACT

A method for preparing a composite alkaline solid polymer electrolyte from polyvinyl alcohol (PVA) polymer, potassium hydroxide and water. The polymer electrolyte is reinforced with glass-fiber cloth to increase a mechanical strength, thermal stability and electrochemical stability. A glass fiber cloth matrix provides a stable interface between a cathode and an anode to reduce a short circuit problem when the battery discharges at high rate. The processes for polymer electrolyte are controlled by molecular weight of PVA polymer, the sequence of feeding in reactants, the weight proportions of reactants, the reaction time, the reaction temperature, and the drying conditions, i.e., under the specified conditions of relative humidity (RH), temperature and drying time. The resulting electrolyte exhibits ionic conductivity of 0.15 S/cm or better at room temperature and has high mechanical intensity and good electrochemical stability.

14 Claims, 9 Drawing Sheets

METHOD FOR MAKING SOLID POLYMER ELECTROLYTE AND USES THEREOF

BACKGROUND OF THE INVENTION

1. Field of the Invention

This invention relates to a method for preparing composite alkaline solid polymer electrolyte from polyvinyl alcohol (PVA) polymer, potassium hydroxide and water, which is reinforced with glass-fiber cloth (GF) to increase its mechanical strength, thermal stability and electrochemical stability. This composite PVA-GF polymer film may be applied in first and secondary thin-film alkaline batteries.

2. Description of the Related Art

Prior literature indicates that polyvinyl alcohol (PVA) is a polymer linked by covalent bonds and hydrogen bonds. It is an amorphous polymer material with low-crystallinity, rotational structure and good flexibility that can block the conduction of electron. PVA is hydrophilic due to its hydroxide group, and has good compatibility with water and potassium hydroxide that also have hydroxide group. The internal conduction of metal ion in PVA polymer is brought about by the strong coupling interaction of metal ion and polymer backbone that produces temporary coordinate bonding, and subsequently the migration of polymer chain. PVA is a polymer material with diverse applications. It is also low-priced and free of any environmental impact.

Fiber glass cloth (see FIG. 1) has similar compositions of ordinary glass. Both are inorganic oxide with silicon dioxide ($SiO_2$) as main component. The glass material is hard and brittle. If it is subjected to high-temperature melting and drawn into glass yarns, it will become flexible with tensile strength increasing by a dozen folds. When used for reinforcement, this material is usually in superfine fibrous state that offers strength and excellent thermal stability. Therefore regardless of the resulting product, there is no residual stress. The broad applications of glass fiber cloth are unparalleled by ordinary glass.

Glass fiber as reinforcement material possess the following properties:

1) High tensile strength which is twice that of steel wire having the same mass.

2) Dimensional stability: Under maximum stress, its unit dimensions change by 3–4% only.

3) High thermal resistance: It retains 50% of tensile strength under the temperature of 343° C.

4) Superior corrosion resistance: It exhibits excellent corrosion resistance and brittleness property when in contact with the majority of chemicals.

5) Excellent fire proofing: It does not burn (generate heat), nor smolder (generate smoke).

PVA polymer electrolyte has extremely high ionic conductivity after processing, but its mechanical strength is not as good as ordinary separators due to structural toughness. This inventor found in the study that the addition of glass fiber cloth in the preparation of PVA polymer electrolyte greatly improved its mechanical strength up to five times that of ordinary separators (see Table 1 and FIG. 3) without sacrificing its conductivity and with the activation energy for ion reaction greatly lowered (see Table 2). It also solved the contraction problem after long-term storage. Due to the high mechanical strength of glass fiber cloth reinforced PVA polymer film, it is less prone to deformation during processing, charging, discharging or packaging of battery. Under scan electron microscope, no pin hole was found on the surface of PVA-GF film. Thus when used in zinc-air fuel cell, it blocks the entry of zinc ion into the air in the cathode when the anode zinc discharges (see Table 3), thereby preventing the occurrence of short circuit. The inventor also found that the electrolyte dipped in PVA polymer was kept in gel state which helps address the leakage problem of battery brought about electrolyte seeping through separator. Moreover this polymer electrolyte retains high conductivity and electrochemical stability under high temperature.

TABLE 1

Comparison of Physical Properties of Separators

| Type | Thickness (mm) | Width (mm) | Strength (kg) | Stress ($kg/cm^2$) | Elongation (%) | Toughness | Draw speed (mm/min) |
|---|---|---|---|---|---|---|---|
| PP/PE separator | 0.17 | 10 | 1.0 | 57.3 | 25.6 | 25 | 200 |
| PVA-GF polymer electrolyte | 0.58 | 10 | 5.5 | 96.1 | 22.2 | 27.5 | 200 |
| PVA polymer electrolyte | 0.48 | 10 | 0.4 | 8.1 | 457 | 182.8 | 200 |

TABLE 2

Comparison of Ionic Conductivity ($\sigma$) of PVA and PVA-GF Film

| | Electrolyte $\sigma$ (S/cm) | |
|---|---|---|
| Temp (° C.) | PVA Electrolyte (M.W: 70,000–80,000) | PVA-GF Electrolyte, 40 $\mu$m thick (M.W.: 70,000–80,000) |
| 30 | 0.1526 | 0.1588 |
| 40 | 0.1799 | 0.1599 |
| 50 | 0.1875 | 0.1615 |
| 60 | 0.1926 | 0.1683 |
| 70. | 0.2061 | 0.1763 |
| Activation energy (Ea) (kJ/mole) | 4.020 | 2.219 |

TABLE 3

Comparison of Discharge of Zinc-Air Fuel Cell with Different Separators

| Discharge current | Type Utilization (%) | | |
| --- | --- | --- | --- |
| | Composite PVA-GF polymer electrolyte | PP/PE 0615 separator | Cellulose separator |
| 150 mA (at C/10) | 96.00 | 89.33 | 81.00 |
| 300 mA (at C/5) | 90.16 | 77.50 | 82.66 |
| Theoretical capacitance (mAh) | 1500 | 1500 | 1500 |

SUMMARY OF THE INVENTION

The present invention provided a method for preparing composite alkaline solid polymer electrolyte from polyvinyl alcohol (PVA) polymer, potassium hydroxide and water, which is reinforced with glass-fiber cloth (GF) to increase its mechanical strength, thermal stability and electrochemical stability. This composite PVA-GF polymer film may be applied in first and secondary thin-film alkaline batteries.

BRIEF DESCRIPTION OF THE DRAWINGS

The present invention can be more fully understood by reference to the following detailed description and accompanying drawings, in which.

DETAILED DESCRIPTION OF THE INVENTION

Figure 1:
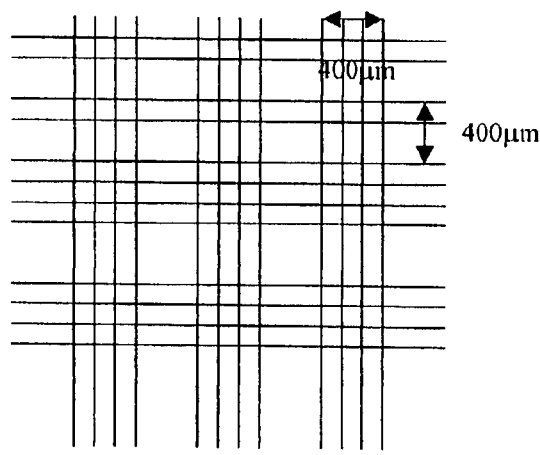
FIG. 1 is a microscopic drawing of glass fiber.

Key technical points for the high-conductivity alkaline solid polymer electrolyte of this invention are as follows:

1) Have PVA and potassium hydroxide react with water separately;

2) Add the potassium hydroxide solution to the PVA solution depending on the dissolution of PVA in water under controlled temperature and time;

3) Terminate the reaction depending on the reaction time and the dissolution of the mixture and then spread the polymer of different quantity on carrier tray to obtain films of desired thickness;

4) Control the film formation time, temperature and humidity to keep proper water content in the polymer film; and 5) Test the electrochemical properties of polymer film.

The preparation procedure and method are described in details as follows:

1) Selection and Pre-treatment of Raw Materials

Use PVA of 80–99% purity with average molecular weight in the range of 2,000–120,000, and preferably between 2,000 and 5,000, in either granule or powder form. Use potassium hydroxide of 85% purity with molecular weight of 56 g/mole in either granule or powder form.

2) Reaction Sequence

The ratio of reactants and reaction sequence will directly affect the composition of polymer film and film formation. If the weight percentage of PVA is too high, dissolution will become difficult and conductivity will drop; if the weight percentage of PVA is too low, film formation might not occur. If the weight percentage of potassium hydroxide is too high, the resulting poor structure will make film formation difficult. If both of these materials are fed at the same time, neither will dissolve. Thus the proportion and dissolution sequence of the reactants are vital in the polymer film process. This inventor finds that mixing 10–20 wt % PVA with 50–60 wt % water under ambient temperature and in a closed environment for approximately two hours will result in complete dissolution. At the same time, adding 15–25 wt % potassium hydroxide to 10–20 wt % water under ambient temperature and in a closed environment to undergo mixture and dissolution.

3) Control of Polymerization Conditions

The temperature and time of polymerization reaction will affect the water content of polymer film; the higher the water content, the higher the conductivity. But polymerization will only occur under specific temperature. Thus the control of polymerization time and reducing the loss of water are vital. This invention mixes the completely dissolved PVA solution and potassium hydroxide solution under ambient temperature. At this time, white solid matter results. Mix it with the solutions thoroughly and heat the solutions in closed container under 50–100° C. for about 30 minutes until that solid matter is completely dissolved. Cool the solution in atmosphere for about 10 minutes. After the solution is cooled, spread the alkaline polymer fluid on the carrier to obtain film of desired thickness.

4) Film Formation Conditions

Cut glass fiber cloth of proper size and lay it flat on the carrier tray. Pour the viscous polymer solution into it and then put the carrier tray into the temperature/humidity chamber under 30–80° C. and 30–60 RH % (optimum conditions are 50–60° C. and 20–30 RH %) for about 30–60 minutes until solid polymer film is formed. Then take out the carrier tray and leave it in atmosphere for 30 minutes before removing the film.

5) Testing the Electrochemical Properties of Polymer Electrolyte (1) Testing of Conductivity Measure the resistance of solid polymer electrolyte with Autolab FRA AC impedance analyzer and dipolar stainless steel electrodes with frequency scan between 1 MHz–0.1 Hz and amplitude of 10 mV. Also measure the conductivity of the polymer electrolyte with Autolab FRA ($\sigma=l/R_b\times A$). At the right side high-frequency area of the Nyquist plot, the impedance value where Z" axis (capacitance) intersects with Z' axis at zero is the resistance ($Z'=R_b$) of polymer film ($R_b$).

(2) Testing of Electrochemical Stability

Use Autolab GPES to measure the cyclic voltammetry of polymer electrolyte, other types of separators with PVA electrolyte. The potential range is −1.5–1.5V, the scan rate is 1 mV/s and stainless steel (SS-316) is used as working electrode.

(3) Testing of Electric Property of Battery

Figure 2:
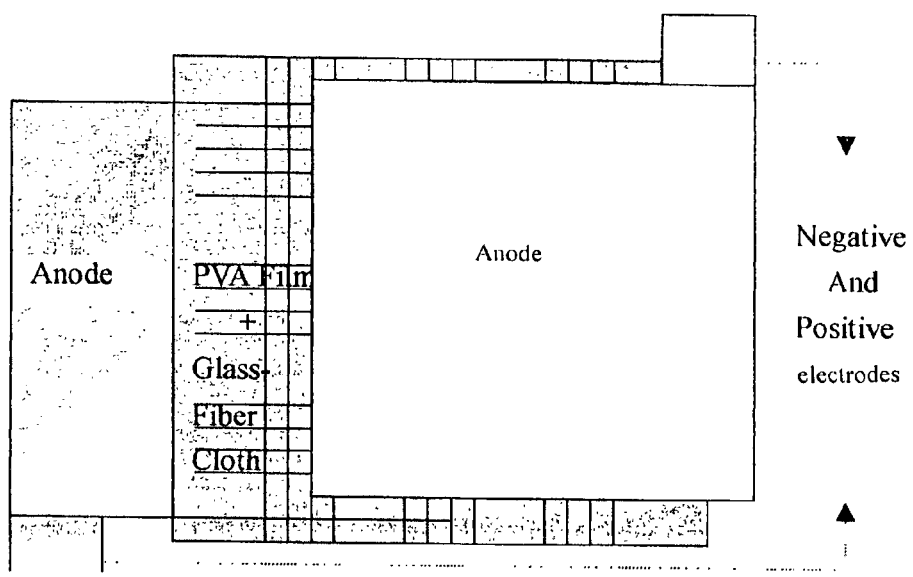
FIG. 2 is a structural diagram of alkaline polymer battery using PVA-GF film of this invention as separator.
Figure 3:
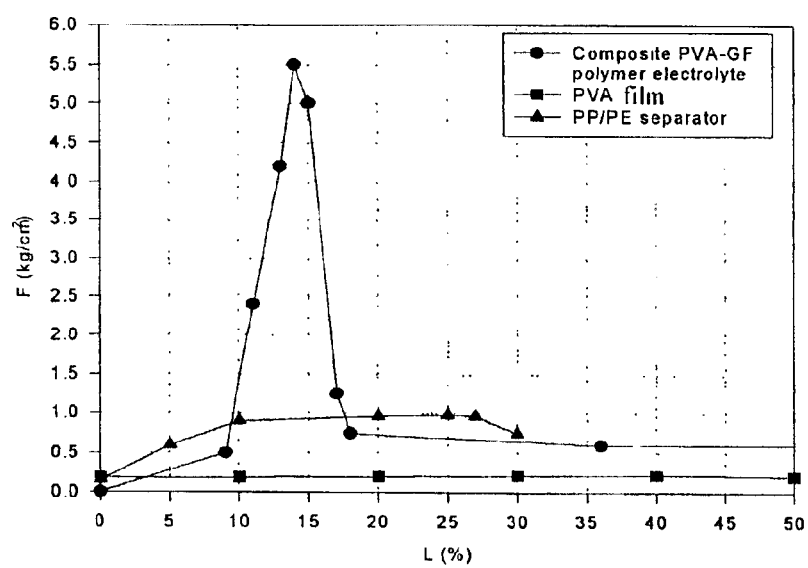
FIG. 3 is graph comparing the mechanical strength of different polymer films.

Assemble a zinc-air battery using the PVA-GF polymer electrolyte of this invention and a zinc electrode (−) and air electrode (+) (see FIG. 2); the electrode area is about 6 cm$^2$ (2 cm×3 cm). Discharge current is 50 mA, 100 mA and 200 mA respectively and compare the performance of batteries with different separator. Also assemble a secondary nickel-metal hydride battery using PVA-GF polymer electrolyte of this invention with metal hydride (MH) and nickel hydroxide as electrodes and carry out charge and discharge tests with 10 mA.

(4) Computation of Chemical Composition of PVA Film

Use weight difference method to compute the composition ratio of PVA polymer electrolyte before and after reaction.

(5) Computation of Activation Energy

Graph log σ against 1/T in Arrhenius Plot to obtain gradient and calculate activation energy.

$$\sigma=\sigma_o\exp(-E_a/RT) \quad (1)$$

$$\log \sigma=\log \sigma_o-E_a/2.303R\times1000\times1/T \quad (2)$$

BRIEF DESCRIPTION OF THE PREFERRED EMBODIMENT

The present invention is further depicted with the illustration of embodiments.

Embodiment 1

Figure 9:
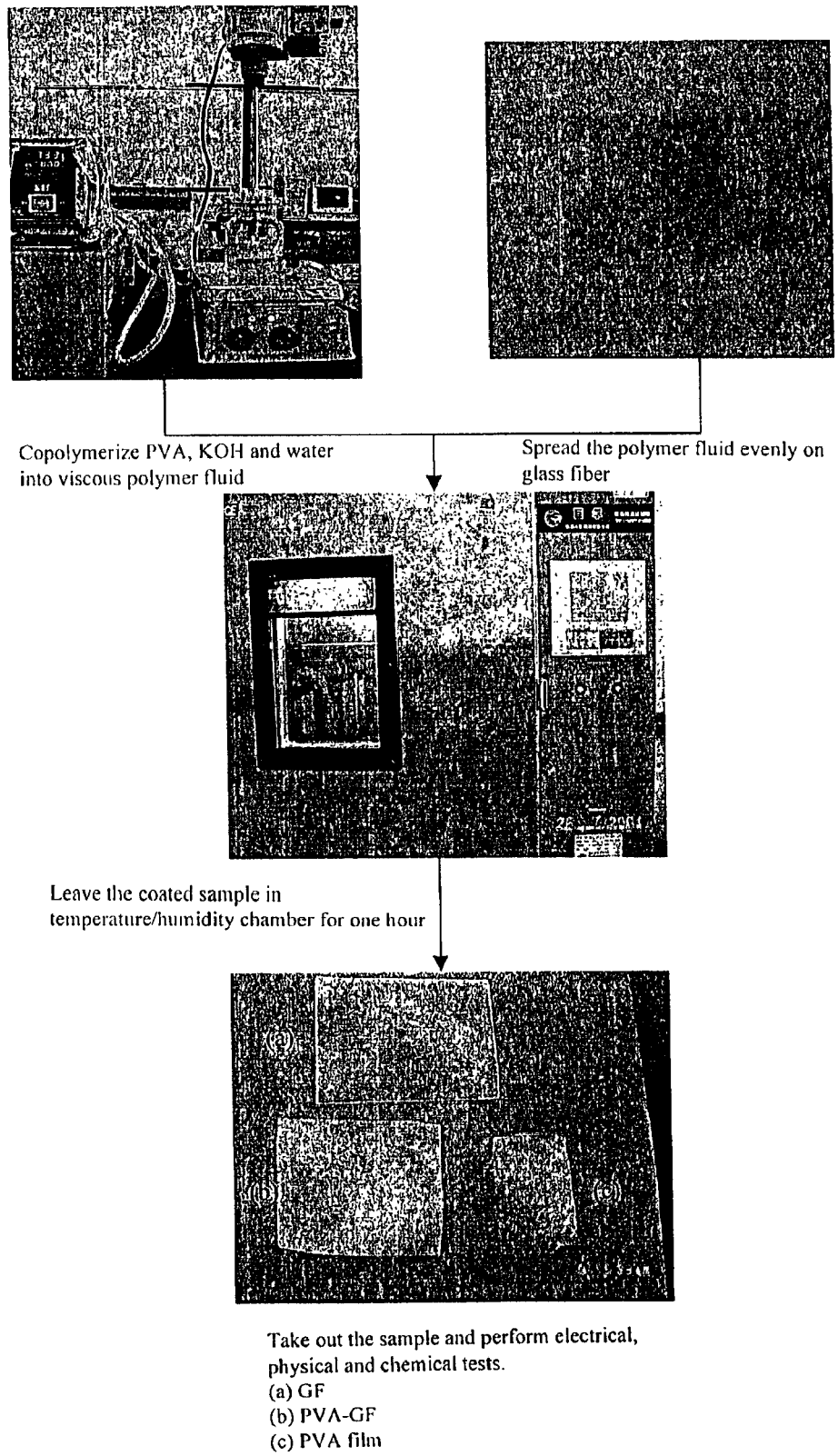
FIG. 9 is a flow chart for the synthesis of PVA-GF solid polymer electrolyte of this invention.

Weigh accurately 8.0 g of polyvinyl alcohol (PVA) and 40 g of water and place them into reactor. Measure the weight of reactor with PVA, water and agitator in it and record it. Agitate for one hour under ambient temperature until PVA is completely dissolved. Dissolve 12.5 g of potassium hydroxide (KOH) in 100 g of water and then pour it into the reactor. Raise the reactor temperature to 60–70° C. and control the polymerization time to under 30 minutes. Measure the weight of reactor with resulting polymer inside and record it, and spread viscous polymer of specific weight (about 5–10 g polymer solution) on glass fiber (GF) and place it in temperature/humidity chamber (control the humidity at 30–40 RH % and temperature at 50–60° C.) for one hour. After that, take it out and leave it in atmosphere for 30 minutes to one hour. Remove the polymer film and weigh it to calculate its chemical composition after drying. Preserve the polymer film in zipper tape for electrochemical analysis. (Refer to FIG. 9).

Embodiment 2

Figure 4A:
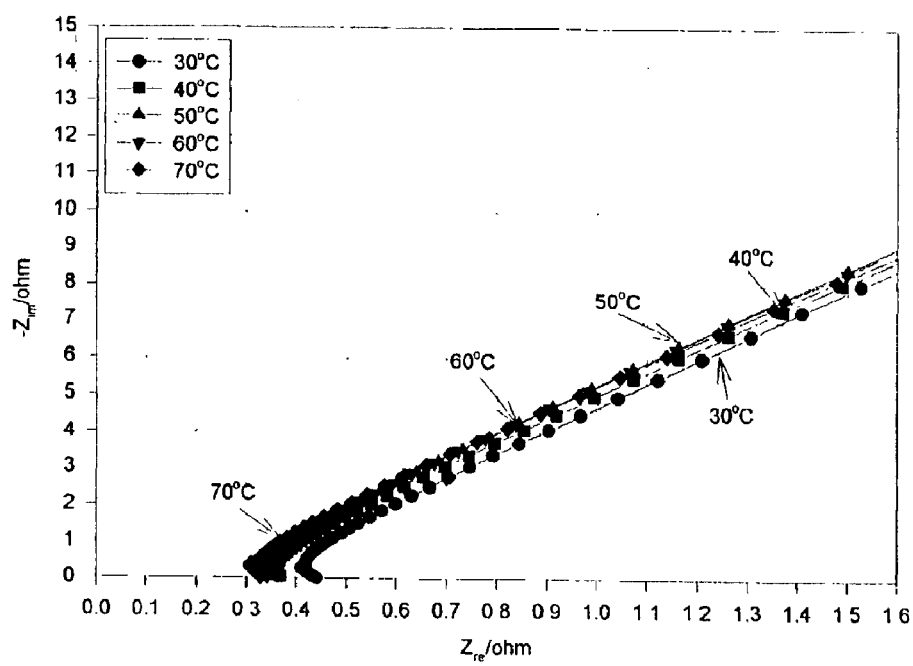
FIG. 4(a) is an AC resistance/impedance graph of PVA film electrolyte.
Figure 4B:
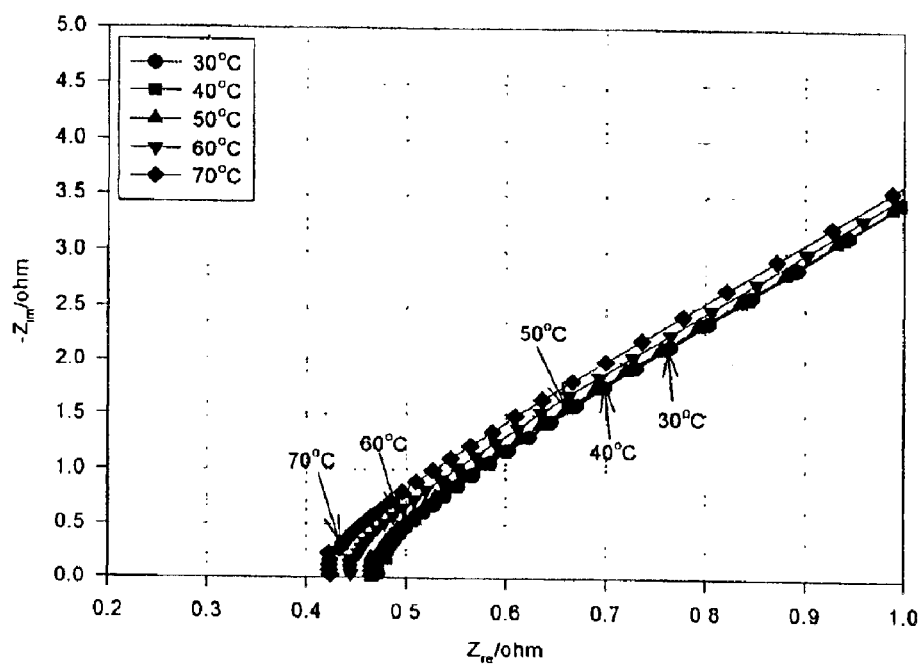
FIG. 4(b) is an AC resistance/impedance graph of PVA-GF film electrolyte.

Take the PVA-GF polymer film obtained in Embodiment 1. Measure its thickness with digital thickness gauge and its ionic conductivity with Autolab FRA of Eco Chemie BV (dipolar stainless steel electrodes) (refer to FIGS. 4(a) and 4(b)). The composition of PVA:KOH:H$_2$O in the PVA-GF polymer film is found to be 30:30:40 wt %; molecular weight (MW) of PVA is 75,000–80,000; its thickness is 0.58 mm or 0.6 mm.

Figure 6A:
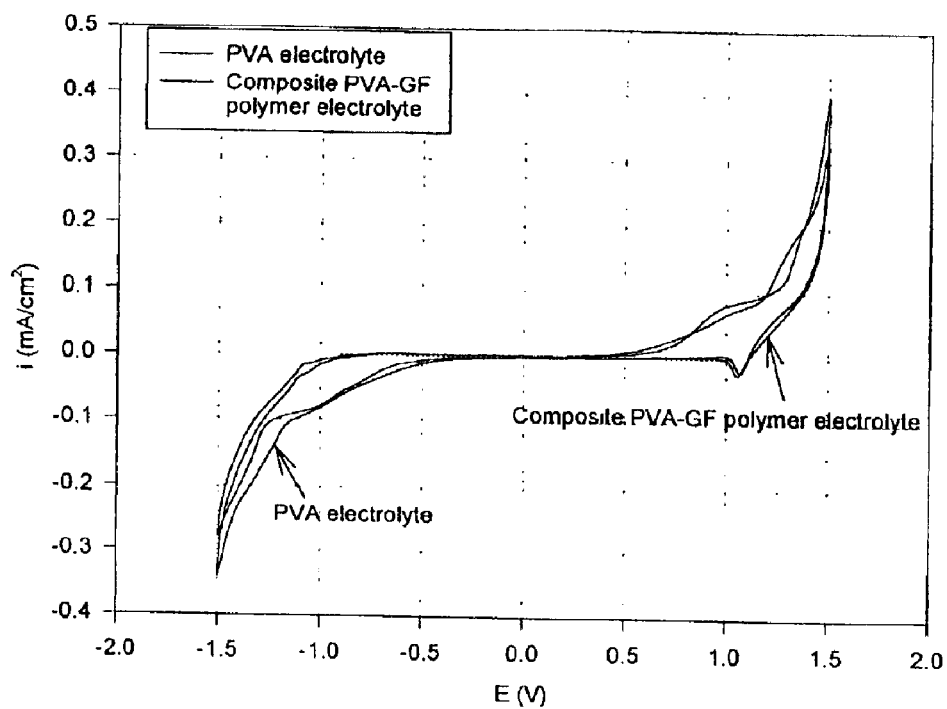
FIG. 6(a) is the cyclic voltammetry of alkaline PVA and PVA-GF polymer electrolyte of this invention at dipolar electrodes; its potential scan rate was 1 mV/s, its scan range between −1.5–1.5V, and its working electrode 316 stainless steel.
Figure 6B:
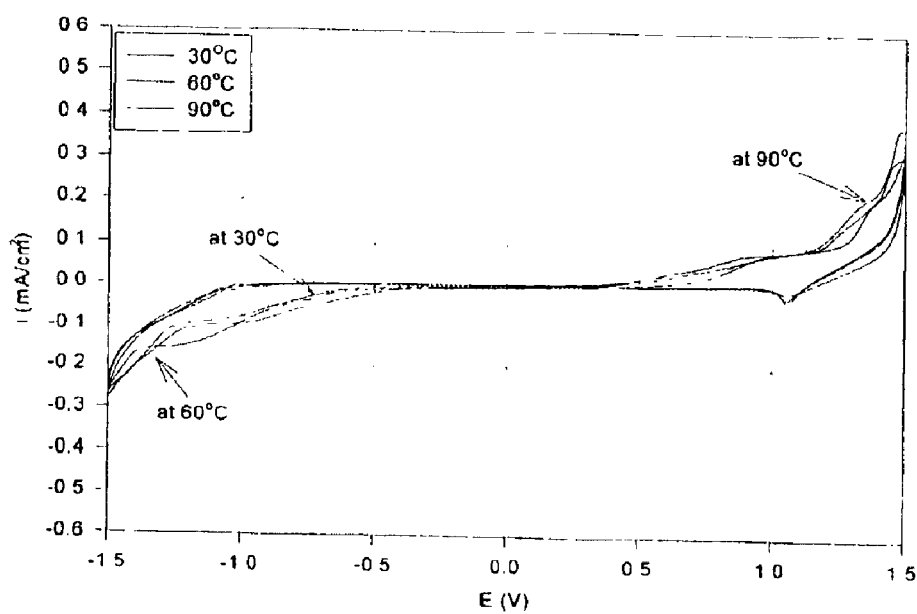
FIG. 6(b) is the cyclic voltammetry of alkaline PVA-GF polymer electrolyte of this invention under different temperature.

The cyclic voltammetry obtained with Autolab FRA (made in Netherlands) is as shown in FIGS. 6(a) and 6(b), from which it is learned that in comparison with PVA film under ambient temperature, the PVA-GF polymer electrolyte in this preferred embodiment did not undergo any oxidation and reduction reaction within working voltage stability of −1.4–1.4V, i.e. there was absence of Faradic current flow. PVA-GF electrolyte exhibited better electrochemical stability than commercially available PP/PE separator (voltage stability of −1.0V–1.0V) and cellulose separator (voltage stability of −1.2–1.2V) with broader range of electrochemical voltage.

Figure 5:
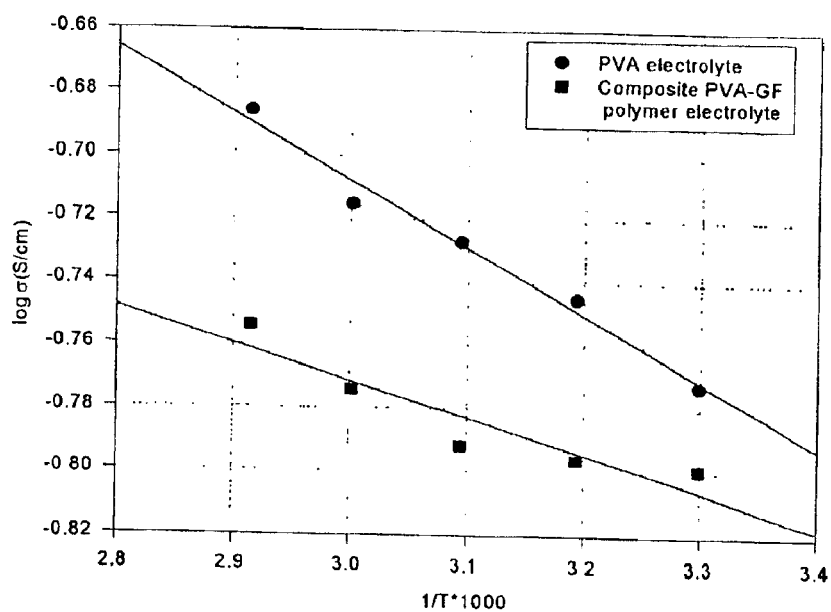
FIG. 5 is the Arrhenius Plot of conductivity ($\sigma$) versus temperature (T) of PVA-GF polymer electrolyte of this invention.

From FIG. 5, the conductivity of PVA polymer electrolyte under ambient temperature of this preferred embodiment was 0.1526 S/cm, its activation energy for reaction was 2–4 kJ/mole, which is much lower than the activation energy of epoxy ethane polymer electrolyte (22–40 kJ/mole). Table 2 displays the change of conductivity of PVA electrolyte and PVA-GF electrolyte under different temperature.

Embodiment 3

Figure 8A:
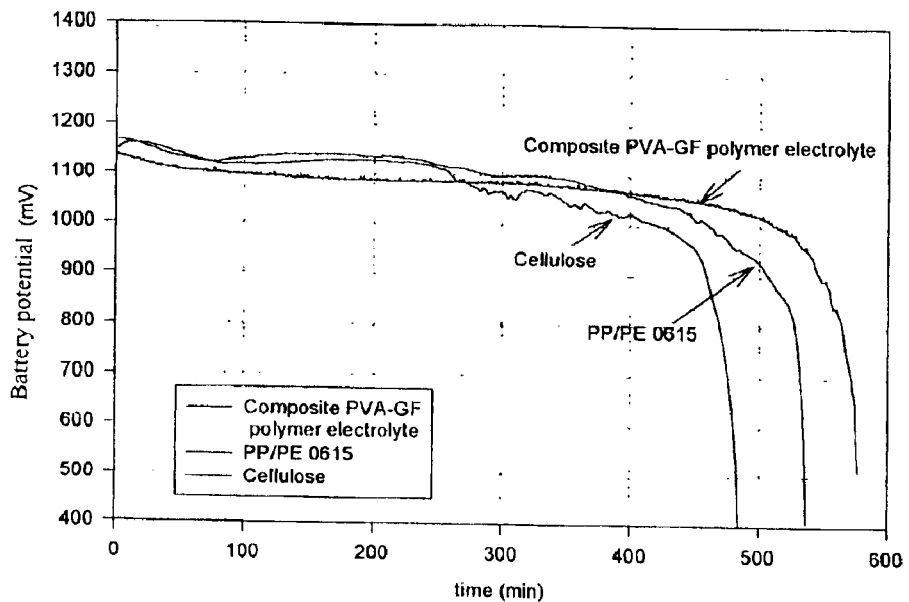
FIG. 8(a) is a voltage diagram of zinc-air battery discharging at the rate of C/10 using alkaline PVA-GF polymer electrolyte of this invention as separator and comparison with the electrochemical properties of other commercially available separators.
Figure 8B:
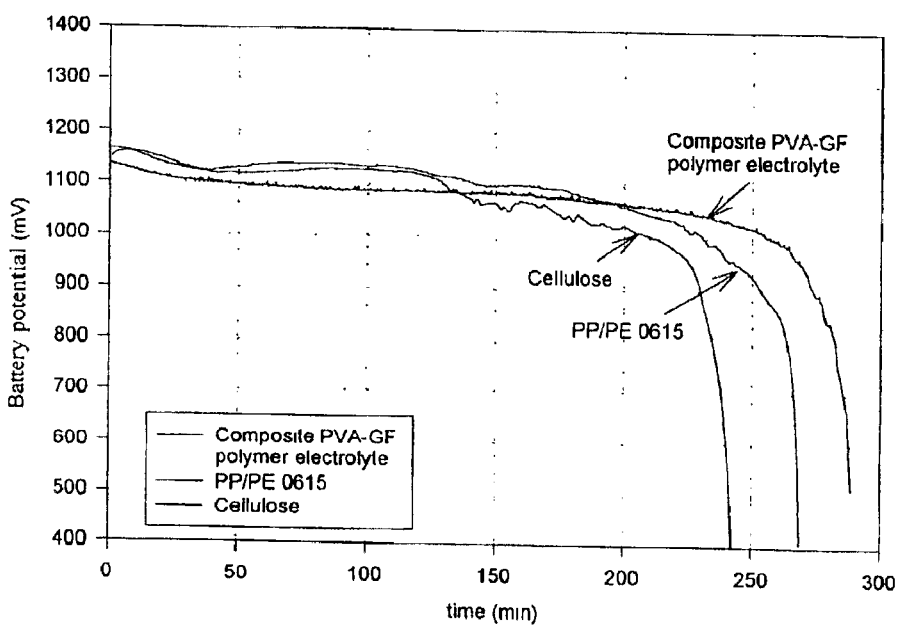
FIG. 8(b) is a voltage diagram of zinc-air battery discharging at the rate of C/5 using alkaline PVA-GF polymer electrolyte of this invention as separator and comparison with the electrochemical properties of other commercially available separators.
Figure 8C:
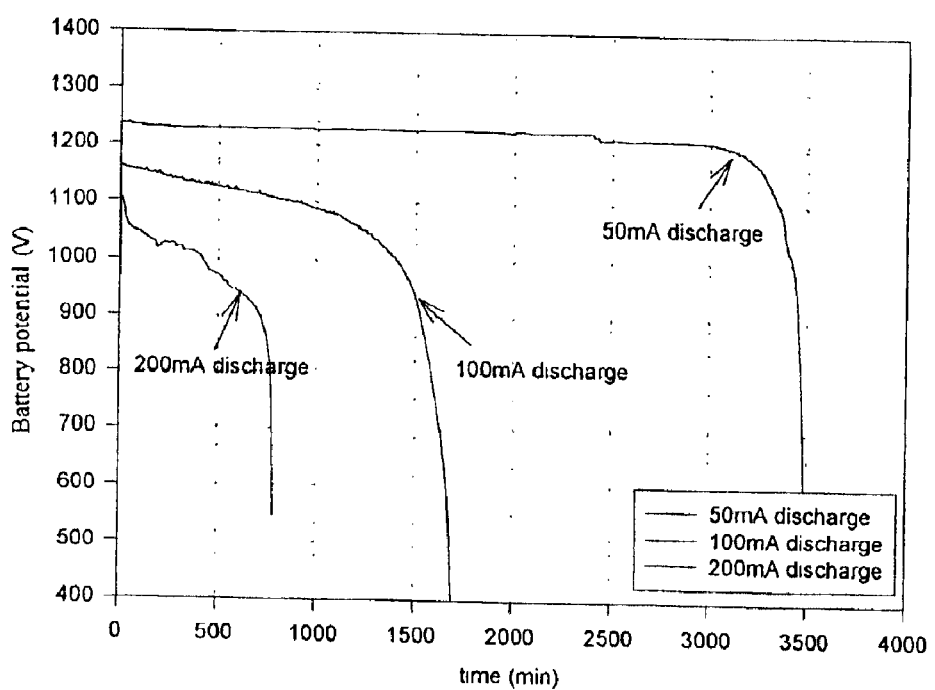
FIG. 8(c) is the discharge voltage diagram of zinc-air battery under different discharge currents with alkaline PVA-GF polymer electrolyte of this invention as separator.

Take 2.5 g zinc gel consisting of 70 wt % zinc powder, PTFE and KOH as cathode and self-prepared air electrode as anode to assemble zinc-air batteries using PP/PE and cellulose as separator respectively. In addition, take the PVA-GF film electrolyte from Embodiment 1 herein to replace the aforesaid PP/PE and cellulose separator in the assembly of another zinc-air battery, and compare the discharge property of different batteries (see Table 4). Keep the theoretical capacitance of the batteries at 1,500 mAh and use discharge current of 50 mA, 100 mA, 150 mA and 200 mA under ambient temperature. The results are as shown in FIGS. 8(a), (b) and (c). In FIG. 8(a) at the discharge rate of C/10, the discharge time of zinc-air battery using PP/PE as separator was 8.9 hours and its utilization rate was 89.33%; the discharge time of zinc-air battery using cellulose as separator was 8.1 hours and its utilization rate was 81%; and the discharge time of zinc-air battery using PVA-GF film cellulose of Embodiment 1 herein was 9.6 hours and its utilization rate reached 96%.

The reason for the significant discrepancy in utilization rate was that the PP/PE or cellulose used in commercially available alkaline battery had pin holes in the size of 20–30 μm. When the battery discharged, the zinc anode would expand after discharge and the zinc was turned into zinc oxide (ZnO) of smaller density, which, due to expansion and squeeze of the electrode, would enter the other electrode along the pin hole and bring about short circuit. When the composite PVA-GF film electrolyte was used as separator, temporary coordination bond was formed due to the dipole force generated between the polymer chain and ions, and ions were conducted through the flexibility of chain. As a result, the expansion of zinc electrode wouldn't lead to short circuit due to the presence of PVA-GF. Thus PVA-GF has higher utilization rate than conventional separators.

TABLE 4

Testing of Zinc-Air Battery Assembled with PVA-GF Electrolyte (Electrode area A = 6 cm²)

| Battery property | Discharge current | | |
|---|---|---|---|
| | 50 mA | 100 mA | 200 mA |
| Discharge time (hr) | 58.3 | 28.3 | 13.1 |
| Actual capacitance (mAh) | 2915 | 2830 | 2620 |
| Theoretical capacitance (mAh) | 3000 | 3000 | 3000 |
| Utilization rate (%) | 97.16 | 94.33 | 87.33 |

Embodiment 4

Figure 7A:
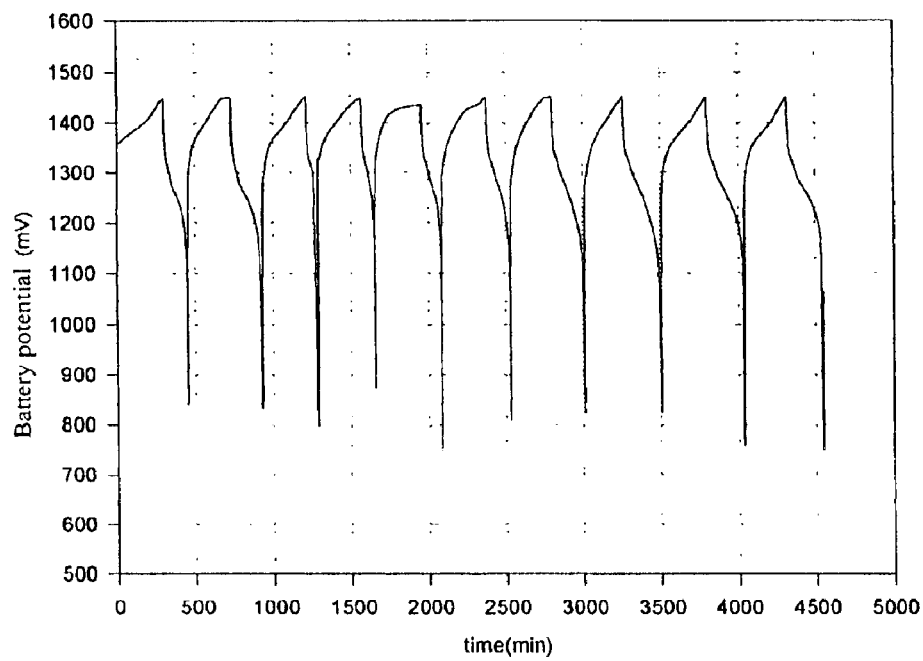
FIG. 7(a) is the voltage diagram of nickel-metal hydride secondary battery during charge-discharge cycle using alkaline PVA-GF polymer electrolyte of this invention as separator.
Figure 7B:
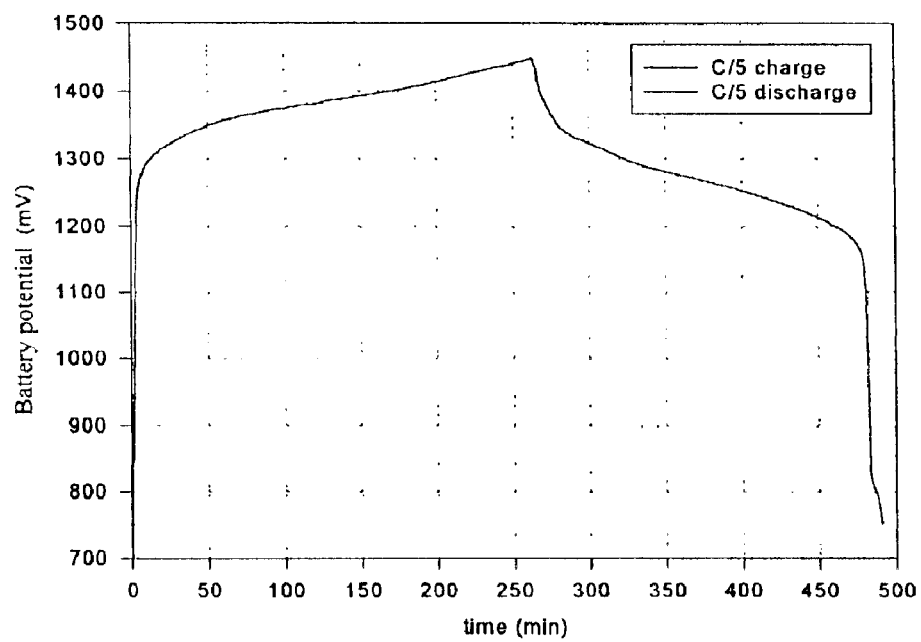
FIG. 7(b) is a diagram of single charge/discharge voltage of nickel-metal hydride secondary battery using alkaline PVA-GF polymer electrolyte of this invention as separator.

Take 0.3 g paste containing 70 wt % nickel hydroxide powder as anode, $AB_5$-type hydrogen storage alloy as cathode, and PVA-GF of Embodiment 1 herein as separator to assemble a nickel-metal hydride secondary battery. Its theoretical capacitance was 50 mAh, and the battery charged and discharged at 10 mA. The results are as shown in FIGS. 7(a) and 7(b). From Table 5, it is leaned that the battery kept 80–90% efficiency after 10 cycles of charge/discharge and its utilization rate was over 80%. In the analysis of electrical property, its charge cut-off voltage was 1.5V and its discharge cut-off voltage was 0.9V.

TABLE 5

Charge/Discharge Results of Zinc-Metal Hydride Battery Assembled with PVA-GF Electrolyte (Electrode area A = 6 cm²)

| Condition | Cycle | | | | | | | | | |
|---|---|---|---|---|---|---|---|---|---|---|
| | 1 | 2 | 3 | 4 | 5 | 6 | 7 | 8 | 9 | 10 |
| Theoretical capacitance (mAh) | 50 | 50 | 50 | 50 | 50 | 50 | 50 | 50 | 50 | 50 |
| Charge current (mA) | 10 | 10 | 10 | 10 | 10 | 10 | 10 | 10 | 10 | 10 |
| Discharge current (mA) | 10 | 10 | 10 | 10 | 10 | 10 | 10 | 10 | 10 | 10 |
| Charge time (hr) | 4.3 | 4.2 | 4.3 | 4.5 | 4.5 | 4.3 | 4.6 | 4.2 | 4.7 | 4.7 |
| Discharge time (hr) | 3.6 | 3.55 | 3.5 | 3.6 | 3.8 | 4.1 | 4.3 | 4.0 | 4.1 | 4.1 |
| Discharge capacitance (mAh) | 36 | 35.5 | 35 | 36 | 38 | 41 | 43 | 40 | 41 | 41 |
| Coulomb efficiency (%) | 83.7 | 84.5 | 81.4 | 80 | 84.4 | 95.3 | 93.4 | 95.2 | 87.2 | 87.2 |
| Utilization rate (%) | 72 | 71 | 70 | 72 | 76 | 82 | 86 | 80 | 82 | 82 |

While the invention has been described with reference to a preferred embodiment thereof, it is to be understood that modifications or variations may be easily made without departing from the spirit of this invention, which is defined by the appended claims.

What is claimed is:

1. A method for preparing solid polymer electrolyte from polyvinyl alcohol, alkaline metal hydroxide and water, comprising the steps of:

a) providing a polyvinvl alcohol solution having polyvinyl alcohol with molecular weight between 2,000–120,000 that comprises 10–20% of the whole reactant by weight to mix with water 50–60% by weight under ambient temperature and in a closed environment, and at the same time, providing an alkaline metal hydroxide solution having alkaline metal hydroxide 15–25% by weight to mix with water under ambient temperature and in a closed environment;

b) mixing and completely dissolving the polyvinyl alcohol solution and alkaline metal hydroxide solution together under ambient temperature to form a mixture and heating the mixture in a closed container up to 50–100° C. to undergo copolymerization and produce a polymer, and then cooling the polymer in atmosphere; and c) spreading the cooled polymer on a glass fiber cloth and a carrier tray, placing the carrier tray in a temperature/humidity chamber for 30–60 minutes under the temperature of 40–80° C. and humidity of 20–50 RH %, and forming a solid state polymer film.

2. The method for preparing solid polymer electrolyte from polyvinyl alcohol, alkaline metal hydroxide and water according to claim 1, wherein the reaction time in step b) is 20–30 minutes.

3. The method for preparing solid polymer electrolyte from polyvinyl alcohol, alkaline metal hydroxide and water according to claim 1, wherein conditions in the temperature/humidity chamber in step c) are 50° C. and humidity of 20–30 RH %.

4. The method for preparing solid polymer electrolyte from polyvinyl alcohol, alkaline metal hydroxide and water according to claim 1, said polyvinyl alcohol has an average molecular weight of 2,000–50,000.

5. The method for preparing solid polymer electrolyte from polyvinyl alcohol, alkaline metal hydroxide and water according to claim 1, wherein said alkaline metal hydroxide is selected from the group consisting of KOH, NaOH, LiOH and a combination thereof.

6. The method for preparing solid polymer electrolyte from polyvinyl alcohol, alkaline metal hydroxide and water according to claim 1, wherein said glass fiber cloth has a thickness of 10–600 μm.

7. The method for preparing solid polymer electrolyte from polyvinyl alcohol, alkaline metal hydroxide and water according to claim 1, wherein the water content of said solid polymer electrolyte is between 30–40 wt %.

8. The method for preparing solid polymer electrolyte from polyvinyl alcohol, alkaline metal hydroxide and water according to claim 1, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

9. The method for preparing solid polymer electrolyte from polyvinyl alcohol, alkaline metal hydroxide and water according to claim 2, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

10. The method for preparing solid polymer electrolyte from polyvinyl alcohol, alkaline metal hydroxide and water according to claim 3, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

11. The method for preparing solid polymer electrolyte from polyvinyl alcohol, alkaline metal hydroxide and water according to claim 4, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

12. The method for preparing solid polymer electrolyte from polyvinyl alcohol, alkaline metal hydroxide and water according to claim 5, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

13. The method for preparing solid polymer electrolyte from polyvinyl alcohol, alkaline metal hydroxide and water according to claim 6, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

14. The method for preparing solid polymer electrolyte from polyvinyl alcohol, alkaline metal hydroxide and water according to claim 7, wherein the solid state polymer film is used in one of a nickel-metal hydride batter, a nickel-cadmium battery, a nickel-zinc battery, fuel cells, a metal-air battery, primary and secondary alkaline batteries and alkaline capacitors.

* * * * *